United States Patent
Thoman et al.

[11] Patent Number: 5,853,221
[45] Date of Patent: Dec. 29, 1998

[54] SWIVEL APPARATUS FOR SECURING A SEAT IN A VEHICLE

[76] Inventors: David Charles Thoman, 51614 Highland Shores Dr., Granger, Ind. 46530; Michael Lawrence Harmon, 1628 Hoover Ave., South Bend, Ind. 46615

[21] Appl. No.: 23,311

[22] Filed: Feb. 13, 1998

[51] Int. Cl.$^6$ .................................................. F16M 13/00
[52] U.S. Cl. .............................. 297/344.24; 297/344.21; 297/344.22; 248/418; 248/425
[58] Field of Search ..................... 297/344.24, 344.21, 297/344.22; 248/418, 425

[56] References Cited

U.S. PATENT DOCUMENTS

| | | | |
|---|---|---|---|
| 3,747,723 | 7/1973 | Peterson et al. | 298/425 X |
| 3,868,084 | 2/1975 | Quakenbush | 248/418 |
| 4,411,395 | 10/1983 | Steffens | 248/425 X |
| 4,544,202 | 10/1985 | Keaton | 297/344.22 |
| 4,640,486 | 2/1987 | Neville | 248/425 |
| 5,082,328 | 1/1992 | Garelick | 248/418 X |
| 5,292,179 | 3/1994 | Forget | 297/344.24 |
| 5,482,354 | 1/1996 | Gryp | 297/344.22 |
| 5,568,960 | 10/1996 | Oleson et al. | 297/344.22 |
| 5,599,065 | 2/1997 | Gryp et al. | 297/344.22 |
| 5,720,462 | 2/1998 | Broderson | 297/344.21 X |

*Primary Examiner*—Peter M. Cuomo
*Assistant Examiner*—Rodney B. White
*Attorney, Agent, or Firm*—Leo H McCormick, Jr.

[57] ABSTRACT

A swivel apparatus (16) on which a seat (10) is mounted in a vehicle to provide for rotation from a first position to a second position. The swivel apparatus (16) includes a support assembly (20) having a base member (22) with a plurality of legs (24, 24'. . . 24") fixed to the vehicle. The base member (22) has a horizontal lower side (26) and a parallel horizontally upper side (28) with a central opening (30) that extends from the lower side (26) to the upper side (28). A collar (34) has a flange (36) which extends through the central opening (30) of the base member (22) to position a first bearing (37) between the collar (34) and the lower side (26) of the base member (22) while the flange (36) aligns a second bearing (38) on the upper side (28) of the base member (22). A mounting member (40) to which the seat (10) is connected is located a top of the second bearing (38) and attached to the flange (36) by a plurality of fastener (46, 46'. . . 46") to define a unitary structure. The seat (10) on being subjected to any inertia forces directs an overturning moment into the mounting member (40). The unitary structure efficiently distributes the overturning moment into the support assembly (20) and in turn into the floor of the vehicle while substantially retaining the seat (10) in a horizontal plane.

9 Claims, 2 Drawing Sheets

5,853,221

SWIVEL APPARATUS FOR SECURING A SEAT IN A VEHICLE

BACKGROUND OF THE INVENTION

Seats having the ability to swivel about a central axle have been installed in vehicles for a number of years. In most applications such seats allow a passenger to either face forward or to rotate the seat to a position wherein the passenger is facing the rear of the vehicle, U.S. Pat. Nos. 3,868,084, 4,640,486 and 5,599,065 illustrate such seats. This type of seat was installed in vans for years until new guidelines set forth by the United States Department of Transportation required a seat to be able to withstand 20 gs inertia forces encountered when a vehicle impacts a fixed barrier and as a result swivel seats employing a central axle were unable to withstand the high inertia force and moments. With a forward facing 50 pound seat occupied by a 200 pound passenger with a lap belt attached to a lower section of the seat and a shoulder belt attached to the vehicle, a swivel connection must withstand an inertia force of 3000 pounds and an overturning moment of about 40,000 inch-pounds. However with the seat facing the rear of a vehicle, all of the inertia force of the seat and its occupant is carried through the central axle of the swivel. In such rear facing position an inertia force of 5000 pounds is produced and as a result a rear-facing seat must withstand an overturning moment of approximately 100,000 inch-pounds about the vehicle floor. Consequently, current safety standards have resulted in the elimination of a swivel seat apparatus on vans manufactured since model year 1992.

SUMMARY OF THE INVENTION

A primary object of the present invention is to provide a swivel apparatus for mounting a seat in a vehicle. This swivel apparatus provides for the rotation of a seat from a first position to a second position 180 degrees from the first position, which is capable of efficiently transmitting inertia forces from the seat to a vehicle while retaining the seat in a substantially horizontal position.

According to this invention, the swivel apparatus includes a support assembly having a base member with a plurality of legs fixed to the vehicle. The base member has a horizontal lower side and a parallel horizontally upper side with a central opening that extends from the lower side to the upper side. A collar has a flange which extends through the central opening to position a first bearing between the collar and the lower side of the base member while the flange aligns a second bearing on the upper side of the base. A mounting member is positioned on the top of the second bearing and attached to the flange by a plurality of fastener to define a unitary structure. The mounting member has a plurality of arms, which are connected, to the seat. Should the seat be subjected to inertia forces such as experienced by a sudden stop or crash, the plurality of arms direct a resulting over-turning moment into the mounting member. Thereafter, the unitary structure efficiently distributes the overturning moment into the support assembly while substantially retaining the seat in a horizontal plane.

An advantage of the swivel apparatus of the present invention is that it provides a fundamentally rigid structure that efficiently distributes inertia forces into a support assembly while retaining a seat in a virtually horizontal plane. This efficient distribution of inertia force to the vehicle allows the use of a lightweight and low cost support assembly.

Using a cast aluminum collar and mounting members or stamped steel members with a plastic or ball bearing arrangement which allows rotation of a seat from a first position to a second position, provides a further advantage of the swivel apparatus of this invention.

BRIEF DESCRIPTION OF THE DRAWINGS

FIG. 1($b$) is a schematic illustration of the passenger seat of FIG. 1($a$) with the seat rotated from the first position to a second position facing the rear of the vehicle;

DETAILED DESCRIPTION

Figures 1A, 1B:
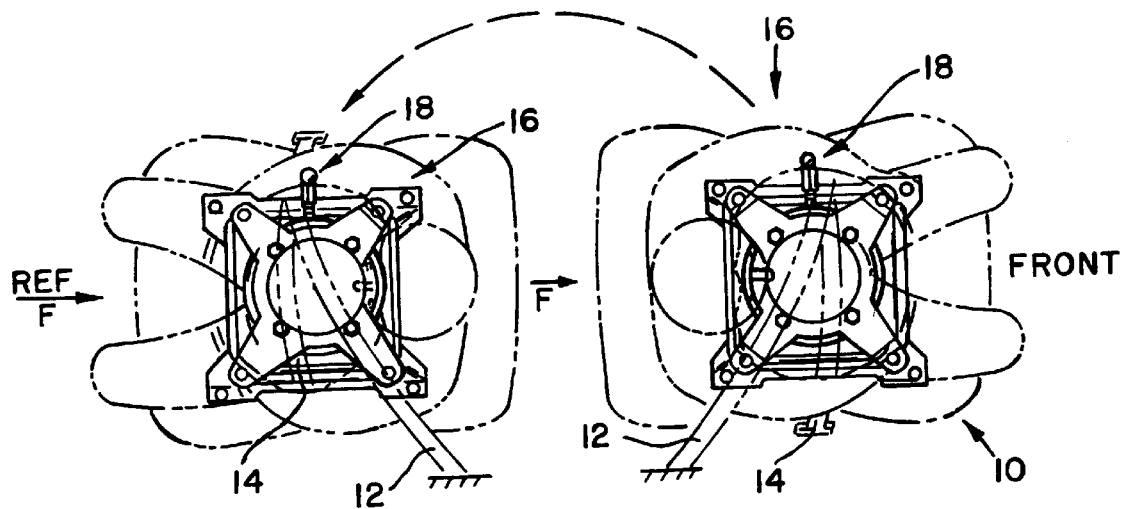
FIG. 1($a$) is a schematic illustration of a passenger seat located in a vehicle including a swivel apparatus made according to the principals of the present invention in a first position facing the front of the vehicle.

The seat 10 shown in FIG. 1($a$) is located in a vehicle with a passenger or occupant facing the front of the vehicle. The passenger is retained in the seat by both a shoulder belt 12 attached to the vehicle and a lap belt 14 secured to a lower section of the seat. With the seat 10 in the forward position, any inertia force F experienced by a passenger in the seat 10 when the vehicle is decelerating is transmitted through the shoulder belt 12 to the vehicle structure and through lap belt 14 into the lower section of seat 10. The inertia force of the seat 10 is distributed to the vehicle floor by way of the swivel apparatus 16. Thus, only a fraction of the inertia forces are carried through the swivel apparatus 16.

When a passenger desires to face the rear of the vehicle, locking means 18 is released and seat 10 is rotated to the position illustrated in FIG. 1($b$). In this position, even though the shoulder belt 12 is attached to the vehicle and lap belt 14 remains secured around the passenger, all seat and occupant inertia forces are applied to the seat 10 and communicated to the vehicle as an overturning moment through the swivel apparatus 16. Thus, the result swivel apparatus 16 must have sufficient strength to withstand an overturning moment resulting from the inertia forces to prevent the connection with the seat 10 from failing and allowing a passenger to be injured. The swivel apparatus 16, as defined by the present invention holds the seat 10 in a substantial horizontal plane.

Figure 2:
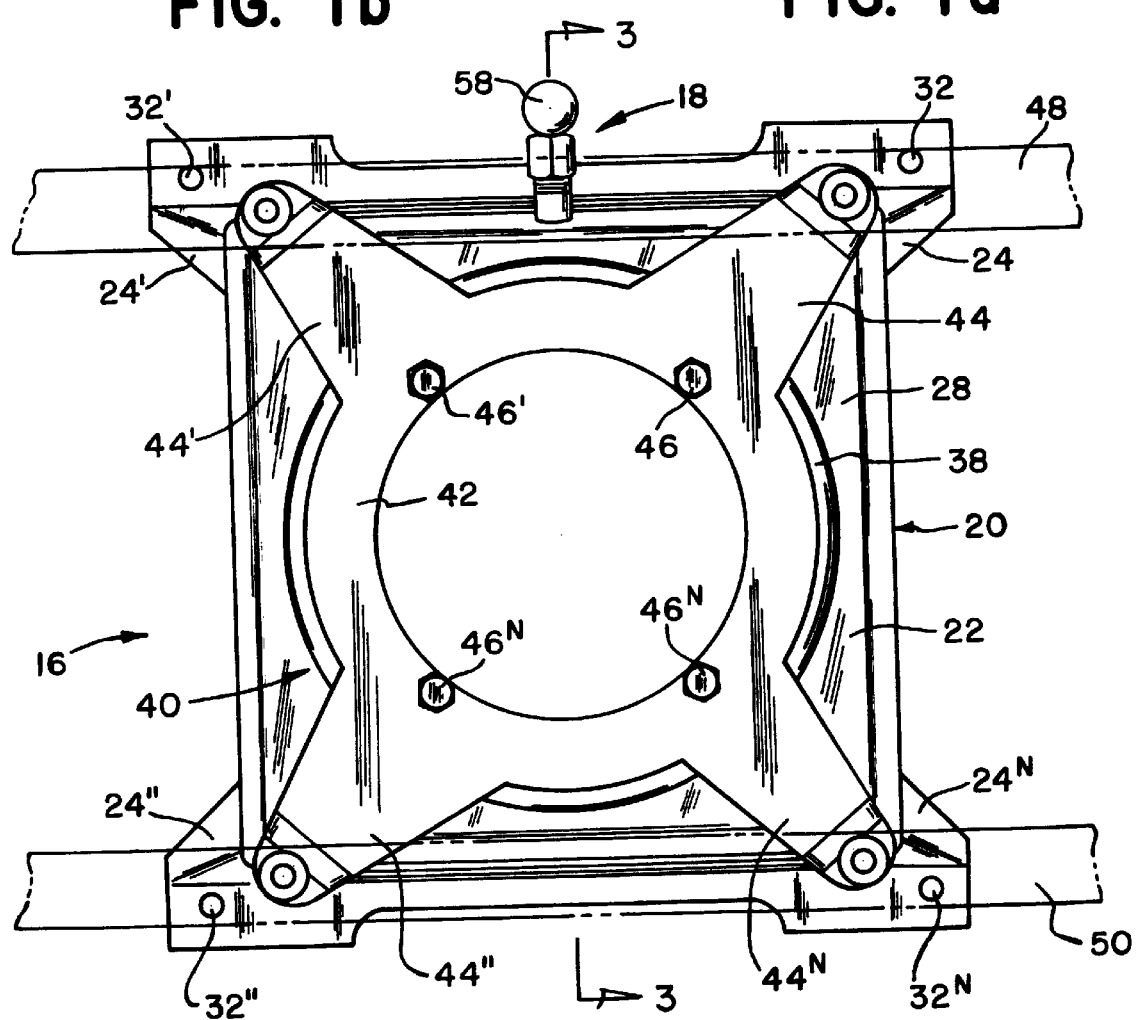
FIG. 2 is a top view of the swivel apparatus of FIG. 1 on which the seat is mounted.
Figure 3:
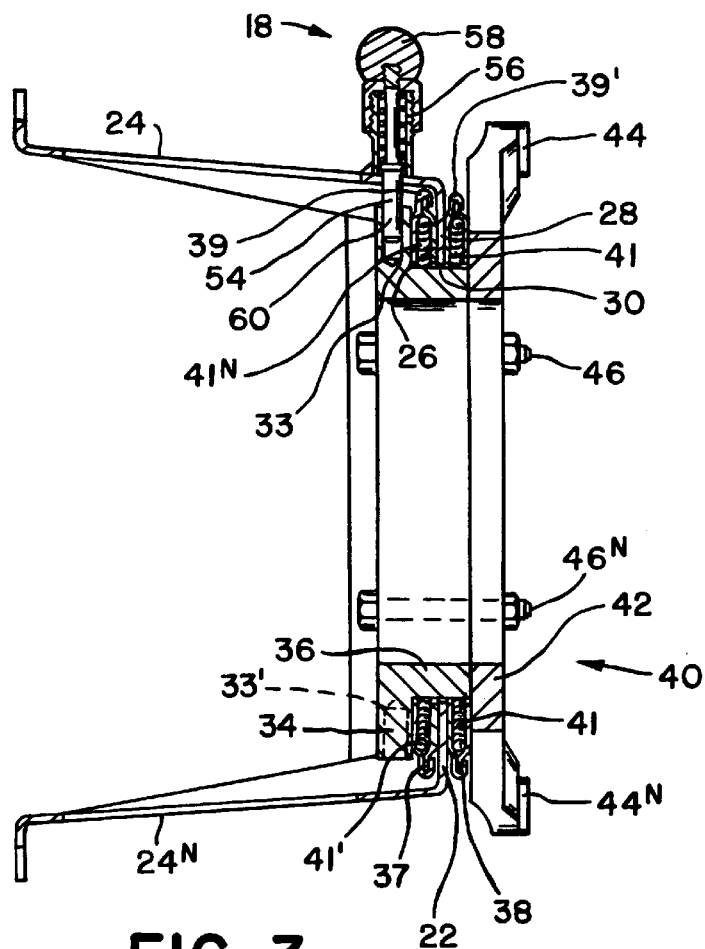
FIG. 3 is a sectional view taken along line 3—3 of FIG. 2.

The swivel apparatus 16 as best shown in FIGS. 2 and 3 has a support assembly 20 with a base member 22. The base member 22, was manufactured of laser cutting, bending and welding a single sheet of steel but in production quantities could be stamped out of a single piece of steel. The bore member 22 has a plurality of legs 24, 24'. . . 24$^n$ that extend from the corners of side members which are welded together. The base member 22 has a horizontal lower side 26 and a parallel horizontal upper side 28 with a central opening 30 that extends from the lower side 26 to the upper side 28. Each of the plurality of legs 24, 24'. . . 24$^n$ is secured to the vehicle through a corresponding bolt 32, 32'. . . 32$^n$. An annular collar 34 which was cast in aluminum has a flange 36 that extends through the central opening 30 to position a first bearing member 37 adjacent the lower side 26 of the base member 22 and to align a second bearing member 38 on the upper side 28 of the base member 22. The first 37 and second 38 bearing members each have a race 39, 39' in which are located a plurality of balls 41, 41'. . . 41$^n$.

A mounting member 40 which was cast in aluminum has an annular ring or shape 42 with a plurality of radial arms 44, 44'... 44$^n$ that extend therefrom. The mounting member 40 is positioned on the top of the second bearing member 38 and secured to the annular collar 34 by a plurality of fasteners 46, 46'... 46$^n$ which vertically extend through flange 36 to define a unitary structure.

A first rail 48 is fixed to the first 44 and second 44' arms and a second rail 50 is fixed to the third 44" and fourth 44$^n$ arms of the mounting member 40. The first 48 and second 50 rails are substantially parallel and designed for receiving well-known adjustment structure which is part of seat 10. The adjustment structure allows the seat 10 to be moved along the first 48 and second 50 rails and change the location of seat 10 with respect the front of a vehicle.

The locking means 18 includes a shaft 54 with a knob 58 attached thereto. The shaft 54 extends through base member 22 of support assembly 20. A spring 56 acts on shaft 54 to urge knob 58 toward the support assembly 20 such that end 60 is located in a first of two opening 33, 33' in annular collar 34. Opening 33 is designed to align seat 10 in a fixed position when an occupant or passenger is facing the front of the vehicle while opening 33' is designed to align seat 10 in a fixed position with an occupant or passenger facing the rear of the vehicle. With shaft 54 located in either opening 33, 33', flange 36 is held in a fixed rotational position with respect to support assembly 20 such that radial arms 44, 44'... 44$^n$ are in alignment with the plurality of legs 24, 24'... 24$^n$ of the support assembly 20.

Figure 4:
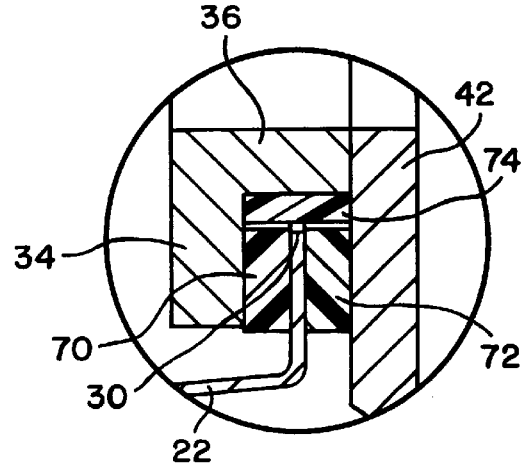
FIG. 4 is a sectional view of an optional bearing arrangement for the swivel mounting structure of the invention.

For some applications, the plurality of balls 41, 41'... 41$^n$ and races 39, 39' for bearing means 37 and 58 may be replaced by a first plastic ring 70 and a second plastic ring 72 as shown in FIG. 4. The first 70 and second 72 plastic rings each having a low coefficient of friction and respectively contact the mounting member 40 and collar 34 to allow seat 10 to be easily rotated from a first position to a second position. Further, to aid in ease of rotation, a plastic sleeve 74 concentric with flange 36 and having a low coefficient of friction is located in opening to providing a smooth surface on which seat 10 rotates.

Figure 5:
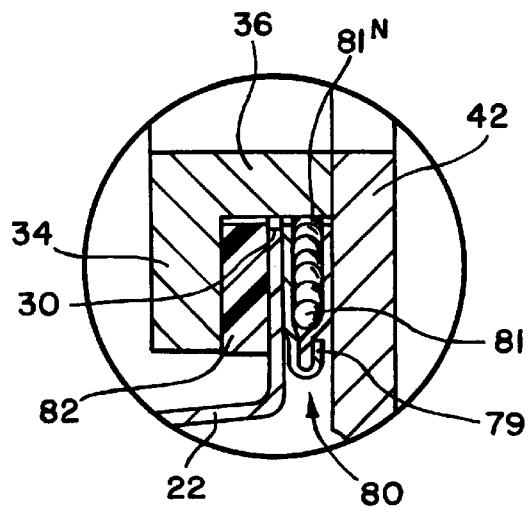
FIG. 5 is a sectional view of a mixed bearing arrangement for the swivel mounting structure of the invention.

Further in some other applications, the plurality of balls 41, 41'... 41$^n$ arid races 39, 39' for bearing means 37 may be replaced as follows: a plurality of balls 81, are 81'... 81$^n$ retained in a race 79 for a top bearing 80 while a plastic ring having a low coefficient of friction defines a bottom bearing 82 as illustrated in FIG. 5. The top bearing 80 contacts the mounting member 40 and the bottom bearing 82 contacts collar 34 to allow seat 10 to be easily rotated from a first position to a second position.

MODE OF OPERATION OF THE INVENTION

When an occupant or passenger desires to change the orientation of seat 10 from facing the front of a vehicle to facing the rear of the vehicle as shown in FIG. 1(a), knob 58 is moved out of opening 33 and seat 10 is rotated 180 degrees where shaft 54 is aligned with opening 33' to fix the position of seat 10 in a positions as shown in FIG. 1(b). In this position, seat and occupant inertia forces are directed through seat 10 along a plane perpendicular to base member 22 to produce an overturning force that is transmitted into the swivel apparatus 16. The unitary structure of the swivel apparatus 16 effectively distributes the overturning moment into the support assembly 20 while substantially maintaining the seat 10 in a horizontal plane.

We claim:

1. A swivel apparatus for a seat in a vehicle comprising:

a support assembly having a base member with a plurality of legs said base member having a horizontal lower side and a parallel horizontal upper side with a central opening that extends from said lower side to said upper side;

a collar having a flange that extends through said central opening;

first bearing means located between said collar and said lower side of said base member;

second bearing means aligned on said upper side of said base by said flange;

a mounting member having an annular ring with a plurality of radial arms extending therefrom, said annular ring being connected to said seat and positioned atop of said second bearing means; and fastener means vertically extending through said flange and mounting member for joining said mounting member with said collar to form a unitary structure, said seat responding to any inertia force directed along a plane perpendicular to said base by directing an overturning moment into said mounting member, said unitary structure efficiently distributes said overturning moment into said support assembly while substantially maintaining said mounting member in a horizontal plane.

2. The swivel apparatus as recited in claim 1 further including:

locking means for holding said flange in a fixed position with respect to said support assembly to selectively position said radial arms in alignment with said plurality of legs of said support assembly.

3. The swivel apparatus as recited in claim 2 further includes:

a first rail fixed to first and second arms of said plurality of arms; and a second rail fixed to third and fourth arms of said plurality of arms, said first and second rails being substantially parallel and receiving said seat, said first and second rails allowing said seat to freely move in horizontal plane in response to an operational input.

4. The swivel apparatus as recited in claim 3 wherein said locking means engages said flange to maintain said first and second rails in axial alignment within the plane of said inertia force.

5. The swivel apparatus as recited in claim 2 wherein said first and second bearing means each include:

a plurality of balls retained in a race, said balls allowing said seat to easily rotate from a first position to a second position, said first and second positions being in substantially a same plane but 180 degrees apart on said mounting member with respect to said locking means.

6. The swivel apparatus as recited in claim 1 wherein said first bearing means is a first plastic ring and said second bearing means is a second plastic ring, said first and second plastic rings having a low coefficient of friction and respectively, contacting said mounting means and collar to allow said seat to be easily rotated from a first position to a second position.

7. The swivel apparatus as recited in claim 6 further including:

a sleeve concentric with said flange, said sleeve being of a plastic material having a low coefficient of friction and providing a surface to assist in easy in rotation of said seat.

8. The swivel apparatus as recited in claim 1 wherein said first bearing means is a plastic ring having a low coefficient of friction and said second bearing means includes a plurality of balls retained in a race, said plastic ring and plurality of balls respectively contacting said mounting means and collar to allow said seat to be easily rotated from a first position to a second position.

9. The swivel apparatus as recited in claim 1 wherein said first bearing means includes a plurality of balls retained in a race and said second bearing means is a plastic ring having a low coefficient of friction, said plastic ring and plurality of balls respectively contacting said mounting means and collar to allow said seat to be easily rotated from a first position to a second position.

* * * * *